United States Patent
San Martin et al.

(10) Patent No.: US 10,670,767 B2
(45) Date of Patent: *Jun. 2, 2020

(54) APPARATUS AND METHOD OF PROCESSING MULTI-COMPONENT INDUCTION DATA

(71) Applicant: Halliburton Energy Services, Inc., Houston, TX (US)

(72) Inventors: Luis Emilio San Martin, Houston, TX (US); Junsheng Hou, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 530 days.

This patent is subject to a terminal disclaimer.

(21) Appl. No.: 15/448,587

(22) Filed: Mar. 2, 2017

(65) Prior Publication Data

US 2017/0176625 A1    Jun. 22, 2017

Related U.S. Application Data

(63) Continuation of application No. 15/029,162, filed as application No. PCT/US2013/067515 on Oct. 30, 2013.

(51) Int. Cl.
*G01V 3/28* (2006.01)
*G01N 27/04* (2006.01)
(Continued)

(52) U.S. Cl.
CPC ............ *G01V 3/28* (2013.01); *E21B 47/026* (2013.01); *E21B 49/00* (2013.01); *G01N 27/041* (2013.01);
(Continued)

(58) Field of Classification Search
None
See application file for complete search history.

(56) References Cited

U.S. PATENT DOCUMENTS 2,359,894 A   10/1944  Hart et al.
2,582,314 A    1/1952  Henri-Georges
(Continued)

FOREIGN PATENT DOCUMENTS

EP   1483602 B1   4/2013
WO   2015065371 A1   5/2015
WO   2015065371 A8   5/2015

OTHER PUBLICATIONS

Beard, et al; "Practical Applications of a New Multichannel and Fully Digital Spectrum Induction System"; 1996, 1996 SPE Annual Technical Conference and Exhibition, Society of Petroleum Engineers, pp. 99-109 (Year: 1996).*

(Continued)

*Primary Examiner* — Alexander Satanovsky
*Assistant Examiner* — Brent A. Fairbanks
(74) *Attorney, Agent, or Firm* — Gilliam IP PLLC

(57) ABSTRACT

A method includes acquiring signals generated from operating a multi-component induction tool in a wellbore. The multi-component induction tool has a plurality of receiver arrays. The method includes generating, for each receiver array at a fixed frequency, a combination of components from the acquired signals, wherein the components corresponds to components of an apparent conductivity tensor. The generating of the combination of components includes generating vertical magnetic dipole (VMD) data and horizontal magnetic dipole (HMD) data. The method includes mixing together the combination of VMD data and HMD data measured from the plurality of receiver arrays and generating data, with respect to evaluation of a formation
(Continued)

around the wellbore, from the mixing together of combinations.

20 Claims, 5 Drawing Sheets

(51) Int. Cl.
    *G01V 3/26*     (2006.01)
    *E21B 47/026*     (2006.01)
    *E21B 49/00*     (2006.01)
    *G01V 3/38*     (2006.01)
    *G01N 23/22*     (2018.01)
    *G01D 21/00*     (2006.01)
    *G06F 17/40*     (2006.01)
    *G06F 19/00*     (2018.01)

(52) U.S. Cl.
    CPC .................. *G01V 3/26* (2013.01); *G01V 3/38* (2013.01); *G01D 21/00* (2013.01); *G01N 23/22* (2013.01); *G06F 17/40* (2013.01); *G06F 19/00* (2013.01)

(56) References Cited

U.S. PATENT DOCUMENTS

| | | | |
|---|---|---|---|
| 2,582,315 A | 1/1952 | Henri-Georges | |
| 2,712,626 A | 7/1955 | Henri-Georges | |
| 2,712,627 A | 7/1955 | Henri-Georges | |
| 2,712,631 A | 7/1955 | Ferre | |
| 2,712,632 A | 7/1955 | Henri-Georges | |
| 2,779,913 A | 1/1957 | Waters | |
| 2,813,248 A | 11/1957 | Ferre | |
| 2,813,249 A | 11/1957 | Henri-Georges | |
| 2,824,279 A | 2/1958 | Ferre et al. | |
| 2,872,637 A | 2/1959 | Andre | |
| 3,521,154 A | 7/1970 | Maricelli | |
| 4,346,460 A | 8/1982 | Schuster | |
| 4,586,137 A | 4/1986 | Frost, Jr. | |
| 6,442,488 B2 | 8/2002 | Xiao et al. | |
| 6,819,112 B2 | 11/2004 | Gianzero et al. | |
| 8,112,227 B2 | 2/2012 | Rabinovich et al. | |
| 2001/0039477 A1* | 11/2001 | Xiao ........................ | G01V 3/28 702/6 |
| 2002/0186013 A1 | 12/2002 | Tabarovsky et al. | |
| 2003/0146752 A1* | 8/2003 | Gianzero .................. | G01V 3/28 324/343 |
| 2005/0274512 A1 | 12/2005 | Tabarovsky et al. | |
| 2008/0215243 A1 | 9/2008 | Rabinovich et al. | |
| 2008/0224707 A1* | 9/2008 | Wisler ...................... | G01V 3/28 324/338 |
| 2009/0237082 A1 | 9/2009 | Samworth | |
| 2010/0230095 A1 | 9/2010 | Yin et al. | |
| 2012/0026314 A1* | 2/2012 | Zhdanov .............. | E21B 47/0002 348/85 |
| 2014/0372040 A1* | 12/2014 | Wu .......................... | G01V 3/28 702/7 |
| 2015/0260872 A1* | 9/2015 | Hou ....................... | E21B 47/026 702/7 |
| 2016/0131791 A1 | 5/2016 | Wu et al. | |
| 2016/0259082 A1 | 9/2016 | San Martin et al. | |

OTHER PUBLICATIONS

U.S. Appl. No. 15/029,162, Ex Parte Quayle Action mailed Jul. 29, 2016, 12 pgs.
U.S. Appl. No. 15/029,162, Response filed Sep. 27, 2016 to Ex Parte Quayle Action mailed Jul. 29, 2016, 14 pgs.
International Application Serial No. PCT/US2013/067515, International Preliminary Report on Patentability dated Feb. 18, 2016, 17 pgs.
International Application Serial No. PCT/US2013/067515, International Search Report dated Jul. 18, 2014, 5 pgs.
International Application Serial No. PCT/US2013/067515, Written Opinion dated Jul. 18, 2014, 14 pgs.
Hou, et al., "Integration of 3D Modeling and Real-time Processing for Enhancement of Anisotropic Formation Evaluation with Borehole Multicomponent Induction Measurements", International Petroleum Technology Conference, IPTC-17124-MS, pp. 1-12, Mar. 2013, 12 pgs.
U.S. Appl. No. 15/029,162, Non-Final Rejection, dated Jul. 25, 2019, 54 pages.
U.S. Appl. No. 15/029,162, Final Rejection, dated Dec. 10, 2018, 58 pages.
GCC Application No. GC2014-28190, Examination Report, dated Dec. 6, 2018, 4 pages.

* cited by examiner

APPARATUS AND METHOD OF PROCESSING MULTI-COMPONENT INDUCTION DATA

TECHNICAL FIELD

The present invention relates generally to apparatus and methods for making measurements related to oil and gas exploration.

BACKGROUND

In drilling wells for oil and gas exploration, understanding the structure and properties of the associated geological formation provides information to aid such exploration. Measurements in a wellbore, as referred to as a borehole, are typically performed to attain this understanding. However, the environment in which the drilling tools operate is at significant distances below the surface and measurements to manage operation of such equipment are made at these locations.

Logging is the process of making measurements via sensors located downhole, which can provide valuable information regarding the formation characteristics. For example, induction logging can utilize electromagnetic signals that can be used to make measurements. Further, the usefulness of such measurements may be related to the precision or quality of the information derived from such measurements.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In various embodiments, apparatus and methods include techniques to process MCI data. The measurements of a multi-component array induction tool can be processed to produce curves with improved resolution at multiple depths of investigation and to provide resolution matched curves that are sensitive to specific formation features at variable depths of investigation. These curves can provide additional information for the formation evaluation and/or be used as quality indicators.

MCI tool measurements can be combined to produce resolution matched curves at different depths of investigation for different combined components of an apparent conductivity tensor. The processing of these different combinations of MCI measurements can be used to describe the formation in a more detailed manner to aid in the process of formation evaluation and produce useful processing quality indicators. There are a number of specific examples described herein for some of these combinations, which demonstrate the usefulness of the techniques and an improvement produced by such techniques.

Figure 1:
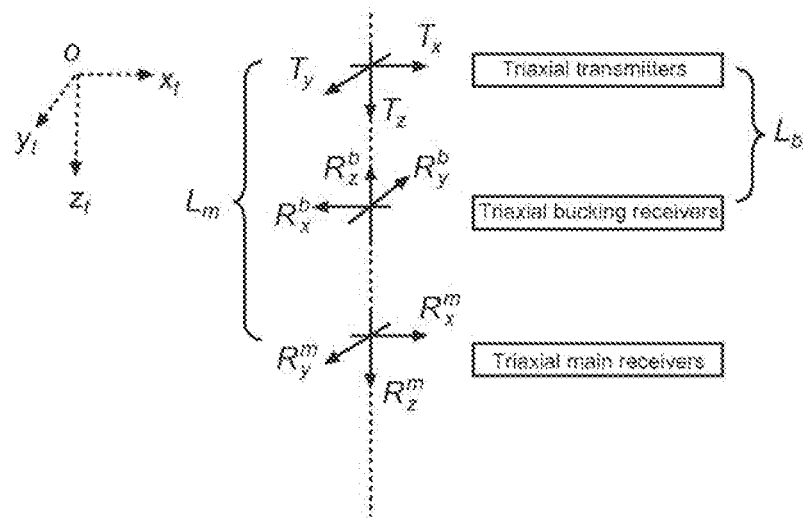
FIG. 1 shows a schematic representation of components of a multi-component induction (MCI) tool, in accordance with various embodiments.

FIG. 1 shows a schematic representation of components of an example MCI tool. The components include a triaxial transmitter triad and a triaxial receiver triad with two parts: a main coil and a bucking coil. The triaxial main receivers are separated from the triaxial transmitters by a distance $L_m$, which is greater than the distance $L_b$ at which the triaxial bucking receivers are separated from the triaxial transmitters. A triad sensor is a structure having three sensors at the same location, where the position or orientation of the three sensors is different from each other. The three sensors of the triad can be mounted on the same structure at a given location. A triaxial triad includes each of the three sensors arranged on an axis of a tool, orthogonal to each other. The configuration shown in FIG. 1 is an example of one of several design options for a MCI-type tool. The type of data that can be produced by such a MCI tool includes data generated by a multi-component array induction tool that generates data at different depths of investigation.

Figure 2:
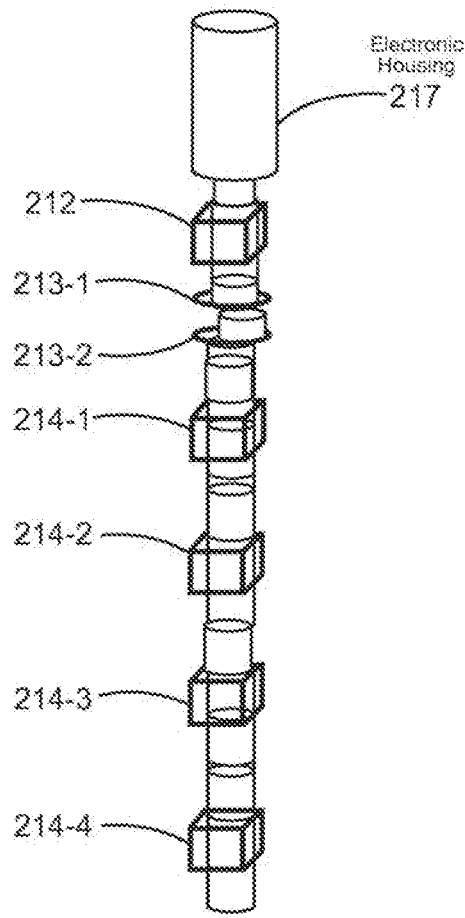
FIG. 2 shows a schematic representation of an example MCI tool, in accordance with various embodiments.

FIG. 2 shows a schematic representation of an embodiment of an example MCI tool. The MCI tool includes a transmitter triad 212, four receiver triads 214-1, 214-2, 214-3, and 214-4, as well as two conventional axial receivers 213-1 and 213-2. The conventional receivers are located closest to the transmitter triad. The receivers are separated from the transmitter triad. For example, one conventional axial receiver 213-1 can be separated from the transmitter triad by 6 inches and the second conventional axial receiver 213-2 can be separated from the transmitter triad 212 by 9 inches. The first receiver triad 214-1 can be separated from the transmitter triad 212 by 17 inches, the second receiver triad 214-2 can be separated from the transmitter triad 212 by 29 inches, the third receiver triad 214-3 can be separated from the transmitter triad 212 by 50 inches, and the fourth receiver triad 214-4 can be separated from the transmitter triad 212 by 80 inches. A MCI tool can be structured with other separation distances. The distances above are mentioned, since calculations were performed at these separation distances in some of the discussions that follow. The configuration shown in FIG. 2 is an example of one of several design options for a MCI-type tool. The type of data that can be produced by such a MCI tool includes data generated by a multi-component array induction tool that generates data at different depths of investigation.

The MCI tool can include an electronic housing 217. The electronic housing 217 can include a control unit to selectively activate the transmitter triad 212 and to selectively acquire signals from the receiver triads 214-1, 214-2, 214-3, and 214-4, and the conventional axial receivers 213-1 and 213-2 in response to a probe signal transmitted from the transmitter triad 212. The electronic housing 217 can include a processing unit to operate on the received signals. The processing unit of the electronic housing 217 may also be arranged to process MCI data derived from the received signals in a manner similar to or identical to techniques taught herein.

Each receiver triad can measure an apparent conductivity tensor of the form shown in equation 1:

$$\bar{\bar{\sigma}}_a = (\sigma_{ij})_{(3\times3)} = \begin{pmatrix} \sigma_{xx} & \sigma_{xy} & \sigma_{xz} \\ \sigma_{yx} & \sigma_{yy} & \sigma_{yz} \\ \sigma_{zx} & \sigma_{zy} & \sigma_{zz} \end{pmatrix} = \begin{pmatrix} \frac{V_{xx}}{K_{xx}^V} & \frac{V_{xy}}{K_{xy}^V} & \frac{V_{xz}}{K_{xz}^V} \\ \frac{V_{yx}}{K_{yx}^V} & \frac{V_{yy}}{K_{yy}^V} & \frac{V_{yz}}{K_{yz}^V} \\ \frac{V_{zx}}{K_{zx}^V} & \frac{V_{zy}}{K_{zy}^V} & \frac{V_{zz}}{K_{zz}^V} \end{pmatrix}, \quad (1)$$

where $V_{ij}$ are the measured voltages on the receiver antennas. These measured voltages can be calibrated (normalized to) to apparent conductivities in equation (1). Here, $\bar{\bar{\sigma}}_a$ is the MCI apparent conductivity tensor in the tool coordinate system ($x_t$, $y_t$, $z_t$) shown in FIG. 1, $$\sigma_{ij} = \frac{V_{ij}}{K_{ij}^V}$$

are the components of the apparent conductivity tensor, $K_{ij}^V$ is the calibration factor (or tool constant) of the tensor coupling a. In general, one can let $K_{xx}^V = K_{yy}^V = K_{xy}^V = K_{yx}^V$, and $K_{xz}^V = K_{yz}^V = K_{zx}^V = K_{zy}^V$ if the MCI tool can be approximated as a dipole-type tool. Therefore, there are only three independent calibration factors in this case for a given triaxial subarray and a given operated frequency: $K_{zz}^V$, $K_{xx}^V$, and $K_{xz}^V$.

A combination of measurements can be made to improve vertical resolution of results for the horizontal formation resistivity Rh. It has been shown that resolution can be improved and borehole effect and shoulder-bed effect can be reduced by combining the vertical magnetic dipole (VMD) and the horizontal magnetic dipole (HMD) couplings of a standard collocated MCI triad. In terms of the MCI measurements, the VMD corresponds to the ZZ coupling and the HMD corresponds to the XX or YY coupling.

In various embodiments, a method is provided to achieve high resolution with variable depth of investigation. This can be accomplished by combining different component data from the different arrays of the MCI tool. With the different receiver arrays of the MCI tool at different distances from a transmitter of the MCI tool, signals received at the receiver arrays in response to a probe signal generated by the transmitter investigate different depths of the surrounding formation. Investigation of different depths of the formation can also be attained by operating at different frequencies. Such processing can deliver higher resolution matching multiple depths of investigation than results for the standard Rh measurements of an MCI tool.

Component combinations corresponding to an apparent conductivity tensor from the different arrays can be generated with the following form:

$$\sigma_{dc}^{(i)} = a^{(i)} \cdot \sigma_{zz}^{(i)} + b^{(i)} \cdot \sigma_{xx}^{(i)} + c^{(i)} \cdot \sigma_{yy}^{(i)}, \quad (2)$$

where $\sigma_{dc}^{(i)}$ are called the direct-coupling combined-log signals for a multi-array MCI tool, the three coefficients $a^{(i)}$, $b^{(i)}$ and $c^{(i)}$ are the constants for fixed array i and fixed frequency, and generally $0 \le a^{(i)} + b^{(i)} + c^{(i)} \le 1$. In some embodiments, all three coefficients $a^{(i)}$, $b^{(i)}$, and $c^{(i)}$ are non-zero. A second combination form can be generated as:

$$\sigma_{cc}^{(i)} = d^{(i)} \cdot \sigma_{IJ}^{(i)} + e^{(i)} \cdot \sigma_{JI}^{(i)}, \quad (3)$$

where $\sigma_{cc}^{(i)}$ are called the cross-coupling combined-log signals, the two coefficients $d^{(i)}$ and $e^{(i)}$ are also the constants for fixed array i and fixed frequency, and $d^{(i)}$ and $e^{(i)}$ can be set to satisfy $0 \le d^{(i)} + e^{(i)} \le 1.0$. For example, if I=x, J=z, and $d^{(i)} = e^{(i)} = 0.5$, then the combined-log signal $\sigma_{cc}^{(i)}$ is (XZ+ZX)/2 from the cross-couplings XZ and ZX of the conductivity component for the fixed array i, which is more sensitive to anisotropy than some other combinations. In this nomenclature XZ correlates to the XZ component of the apparent conductivity tensor and ZX correlates to the ZX component of the apparent conductivity tensor. Similar nomenclature is used for the other components of the apparent conductivity tensor. If I=x, J=z, and $d^{(i)} = 0.5$, $e^{(i)} = -0.5$, the combined-log signal $\sigma_{cc}^{(i)}$ is (XZ-ZX)/2, which is more sensitive to bed boundaries than some other combinations.

Figure 3:
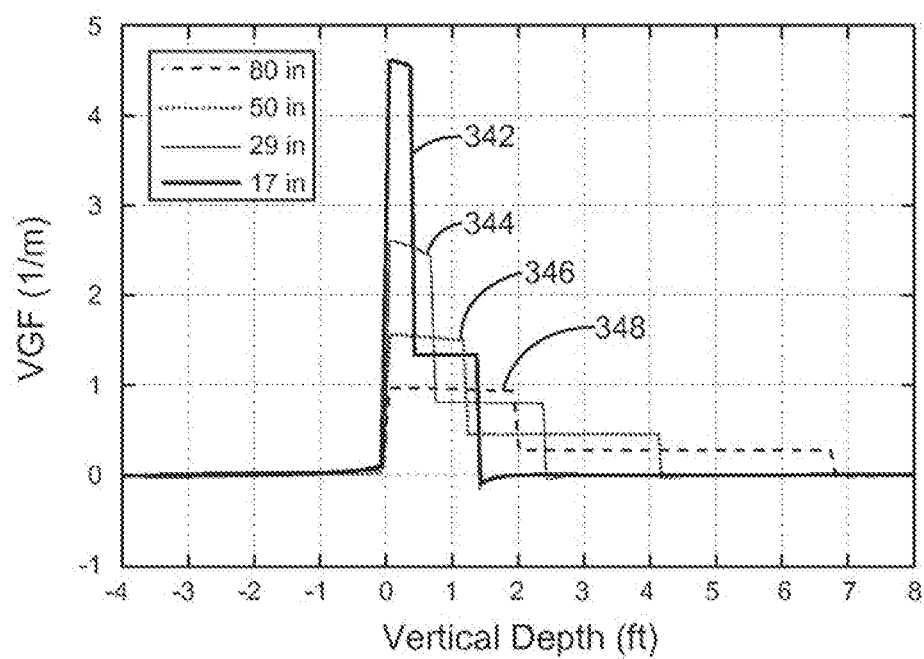
FIG. 3 shows a plot of a vertical geometrical factor (VGF) for each array of a four-array MCI tool at zero background conductivity, in accordance with various embodiments.

An example of combined measurements to achieve higher resolution, reduced borehole effect, and reduced shoulder-bed effect is 1.5*ZZ-0.5*XX-0.5*YY, which is the direct-coupling combined-log signals of equation (2) with $a^{(i)} = 1.5$, $b^{(i)} = -0.5$, and $c^{(i)} = -0.5$. FIG. 3 shows a vertical geometrical factor (VGF) for each array of a four-array MCI tool at zero background conductivity for the component combination 1.5*ZZ-0.5*XX-0.5*YY. Curve 342 shows the VGF for the array having a 17 inch separation. Curve 344 shows the VGF for the array having a 29 inch separation. Curve 346 shows the VGF for the array having a 50 inch separation. Curve 348 shows the VGF for the array having an 80 inch separation. FIG. 3 also shows reduced shoulder-bed effect. The VGF is measure of response of the tool along the tool axis as a function of distance from the tool related to the geometry of the tool.

Figure 4:
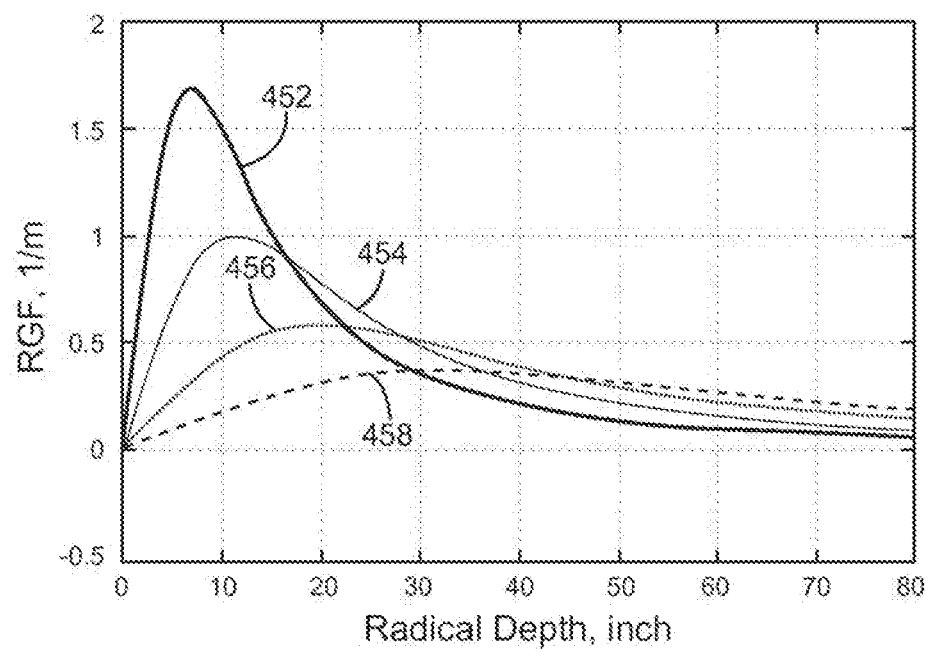
FIG. 4 shows a radial geometrical factor (RGF) for each array of a four-array MCI tool at zero background conductivity, in accordance with various embodiments.

FIG. 4 shows a radial geometrical factor (RGF) for each array of the four-array MCI tool at zero background conductivity for the component combination 1.5*ZZ-0.5*XX-0.5*YY. Curve 452 shows the RGF for the array having a 17 inch separation. Curve 454 shows the RGF for the array having a 29 inch separation. Curve 456 shows the RGF for the array having a 50 inch separation. Curve 458 shows the RGF for the array having an 80 inch separation. The RGF is measure of a radial response of the tool perpendicular to the tool axis as a function of distance from the tool related to the geometry of the tool.

These combinations of tensor component measurements can be developed into resolution match of multiple depths of investigation by mixing together the combinations measured from the different arrays of the MCI tool. The results of this processing can be used as quality indicators or provide additional information in the formation evaluation process.

The signal processing method for the traditional array induction data that combines measurements from different receiver arrays located at different distances from the transmitter relies on concepts from geometrical factor theory, which is a good approximation in the high resistivity limit. Such a framework can be used to derive a processing method for the combinations of signals in equations (2) and (3). This approach leads to the development of filters that can be applied to the combined tensor components of equations (2) and (3) from the different arrays of the MCI tool. These filters can be derived by using standard approximations such as Doll's geometrical theory or Born approximation method. The following discussion provides features of an embodiment of an example development of filters. For this example, the standard apparent conductivity is used in the presentation, but is replaceable in all expressions by the combinations shown in equations (2) and (3).

From the electromagnetic Born approximation theory, the combined apparent conductivity $\sigma_a^{(i)}(z)$ of the MCI tool may be expressed as a the double integral in a cylindrical coordinate system for one multi-array tool as $$\sigma_a^{(i)}(z) = \iint g^{(i)}(\rho, z-z') \cdot \sigma(\rho, z') \cdot d\rho dz', i=1,2, \ldots, N \quad (4)$$

in which function $g^{(i)}(\rho, z-z)$ is the combined two-dimensional (2D) Born (or Doll) geometrical factor, which describes the response of the i-th individual array at a given frequency, $\rho(\rho,z)$ is the 2D true formation conductivity distribution, and N is the number of triad receivers in the MCI tool. The Born approach provides analysis of the response of the MCI tool, where contributions from the formation are taken as a perturbation from background conductivity. Using a Born approach, a response for zero conductivity corresponds to the geometrical factor.

To produce a new log, a weighted sum of the individual array readings can be computed over a depth window from $z_{min}$ to $z_{max}$ surrounding the output logging point, as $$\sigma_{RDF}^{(j)}(z) = \sum_{i=1}^{N} \sum_{z'=z_{min}}^{z_{max}} w_i^{(j)}(z') \cdot \sigma_a^{(i)}(z-z'), j=1, 2, \ldots, M \quad (5)$$

where, $\sigma_{RDF}^{(j)}(z)$ is the apparent conductivity of the radial-direction focusing (RDF) log curve, $\sigma_a^{(i)}$ is the skin-effect corrected (SEC) and borehole-corrected log of the i-th subarray, and M is the total number of the RDF targeted radial depths. The depth window $z_{min}$ to $z_{max}$ provides a range over which the received signals contributes significantly with the measurement. Equation (4) can be used to provide the RDF processing.

Substituting equation (4) into equation (5) yields the following equation:

$$\sigma_{RDF}^{(j)}(z) = \sum_{i=1}^{N} \sum_{z'=z_{min}}^{z_{max}} w_i^{(j)}(z') \cdot \iint g^{(i)}(\rho, z-z')\sigma(\rho, z') \cdot d\rho dz', \quad (6)$$

or $$\sigma_{RDF}^{(j)}(z) = \iint g_{RDF}^{(j)}(\rho, z-z')\sigma(\rho, z') \cdot d\rho dz', \quad (7)$$

where $$g_{RDF}^{(j)}(\rho, z) = \sum_{i=1}^{N} \sum_{z'=z_{min}}^{z_{max}} w_i^{(j)}(z') \cdot g^{(i)}(\rho, z-z'), \quad (8)$$

The function $g_{RDF}^{(j)}(\rho, z)$ in equation (8) is a 2D response function defining the ideal features of 2D focusing and it is often referred to as the "target" function of the 2D RDF processing. The function $g^{(j)}(\rho, z)$ is the combined (loop-source or point-source) Born (or Doll) response function or geometrical factor of each individual subarray. Hence, it is a weighted sum of the Born (or Doll) response function of each individual subarray. As $g^{(j)}(\rho, z)$ is dependent on background conductivity, and hence $g_{RDF}^{(j)}(\rho, z)$ is a function of the conductivity.

Equation (8) can be used to design a filter. In equation (8), the output to be determined are the weights $w_i^{(j)}(z')$, which provide filter coefficients. The $g_{RDF}^{(j)}(\rho, z)$ is a desired shape function to process incoming raw measurements of the conductivity, such that the filter is adjusted to provide the desired shape. The $g_{RDF}^{(j)}(\rho, z)$ shape function can be selected to provide a desired resolution and is an input to equation (8). As noted above, $g^{(j)}(\rho, z)$ is a geometrical factor of an individual subarray and is a known input for equation (8). For example, a VGF curve, similar to those of FIG. 3, provides the input geometrical factor for a selected receiver array, which may be defined by its separation distance from a transmitter.

Also in equation (8), the normalization condition of $g_{RDF}^{(j)}(\rho, z)$ can be obtained as $$\int_{0}^{+\infty} \int_{-\infty}^{+\infty} g_{RDF}^{(j)}(\rho, z') \cdot d\rho dz' = 1 \quad (9)$$

or $$\sum_{i=1}^{N} \sum_{z'=z_{min}}^{z_{max}} w_i(z') = 1. \quad (10)$$

Equations (9) and (10) provide normalization constraints on equation (8). The filter weights, $w_i(z')$, can be pre-determined using the optimization to solve equation (8) with other constraints such as equations (9) or (10). For different background conductivities, filter weights can be generated and stored in a library/look-up table. When applying a filter, the filter weights for a given conductivity can be obtained from the library/look-up table.

After the above RDF processing, the processed curves have varied vertical resolutions, which may range from 1 ft to 8 ft. In general, several sets of final log curves with different vertical resolutions (e.g., 1 ft, 2 ft, etc) can be produced by using the vertical-resolution matching (VRM) or vertical-resolution enhancement (VRE). For example, each receiver triad 214-1, 214-2, 214-3, and 214-4 as shown in FIG. 2 is at a different distance from transmitter triad 212 and will have a different depth of investigation. In addition, a log for each of these receivers will have an associated resolution. A vertical resolution, for instance, provides a measurement distance that indicates the ability of a logging tool to determine changes of data with respect to the horizontal direction to the tool. Vertical-resolution matching can combine logs of different depths of investigation that have the same vertical resolution. VRM/VRE processing involves processing to extract high vertical resolution information from high-resolution curves and impose them onto the low-resolution curves. These curves can be implemented by using the conventional induction-log VRM/VRE processing.

In a similar way, the high resolution information of the high resolution curves associated with the short distance receivers can be used to constrain the inversion of the longer distance arrays. Constraining the inversion of the longer distance arrays with the high resolution curves associated with the short distance receivers achieves a resolution match set of curves. This technique provides an alternative way of processing the combined curves of equations (2) and (3) to achieve the multiple depth resolution match results.

An alternative method to derive resolution match variable depth of investigation for the component combinations of equations (2) and (3) can be achieved by using constrained inversion of the combined measurements from the different arrays of the MCI tool. That is, the combined signals of equations (2) and (3) generated by the different arrays of the MCI tool, which are located at different distances from the transmitter, can be use as input in an inversion algorithm, in which the information from the short arrays is used as constraints in the inversion of the deeper arrays.

In various embodiments, processing techniques for the combined signals of VMD and HMD of a MCI tool can provide enhancements over ZZ processing results of traditional induction tools. These processing techniques can combine the VMD and the HMD of the MCI tool to utilize the improved radial and vertical characteristics of the combined signal. In various embodiments, the HMD signals combined with the VMD can include contributions from both horizontal directions. By combining the VMD, the HMD, and the multiple spacings of the MCI tool, such processing can deliver higher resolution than standard induction processing that uses only the VMD information from different arrays. Such combined signal processing, as described herein, has reduced borehole effect and reduced shoulder bed effect. The effect of eccentricity is also reduced due to less sensitivity of the combined signal to the borehole region, as compared with the traditional array induction processing, that uses the VMD exclusively. The component combinations of these processing techniques can generate additional information useful in the assessment of quality of the MCI measurement and useful to facilitate interpretation of log data.

Figure 5:
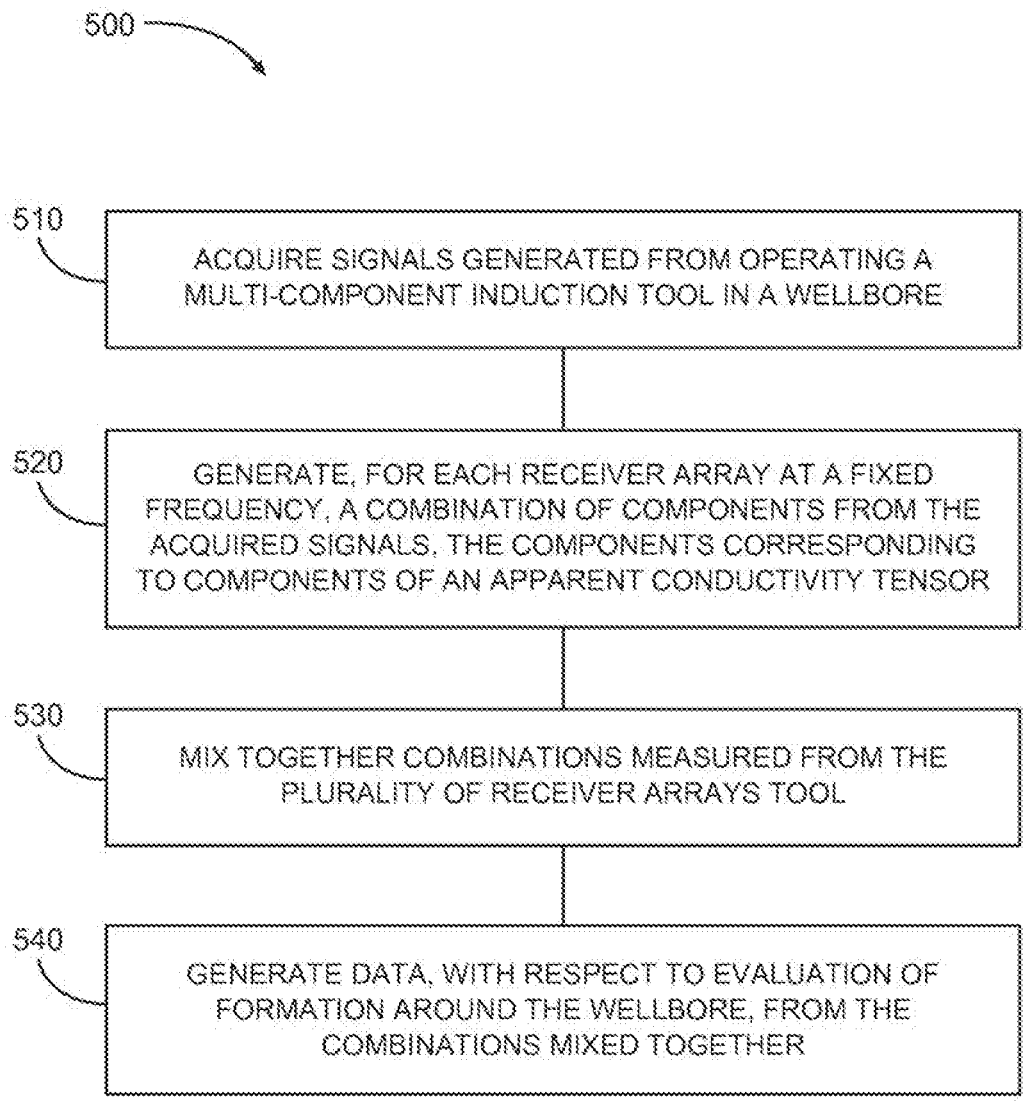
FIG. 5 shows features of an example method of processing MCI data, in accordance with various embodiments.

FIG. 5 shows features of an embodiment of an example method of processing MCI data. The processing can be realized under the control of a processor. At 510, signals generated from operating a multi-component induction tool in a wellbore are acquired. The multi-component induction tool can have a plurality of receiver arrays. Acquiring signals generated from operating the multi-component induction tool can include acquiring signals from a plurality of receiver triads disposed axially on the multi-component induction tool in response to a transmitter triad disposed axially on the multi-component induction tool generating probe signals, the receiver triads are arranged at different distances from the transmitter triad. At 520, for each receiver array at a fixed frequency, a combination of components from the acquired signals is generated, where the components correspond to components of an apparent conductivity tensor. The combination of components can include XX, YY, and ZZ components or the combination of components can include cross-coupling components. A format of the combination of components can be selected based on a targeted specific feature of the formation. For example, the targeted specific feature can be anisotropy, bed boundaries, or fractures. At 530, combinations measured from the plurality of receiver arrays are mixed together. At 540, data, with respect to evaluation of formation around the wellbore, is generated from the mixing of the combinations together.

The method can include additional processing to take into consideration operation parameters other than using receiver arrays at different distances from a transmitter or transmitter array. The method can include acquiring signals generated from operating the multi-component induction tool at multiple subarrays and a number of different frequencies; generating, for each receiver array at each frequency, a combination of components from the acquired signals, the components corresponding to components of an apparent conductivity tensor; mixing together combinations measured from the plurality of receiver arrays at the different frequencies; and generating data with respect to evaluation of formation around the wellbore, from mixing the combinations together. For multiple receiver arrays operated at one frequency or operated over different frequencies, the method can include performing acquisition of signals and generation of the combinations for a number of different locations to which the multi-component induction tool is disposed along the borehole; and mixing together the combinations from the different locations.

Generating combinations of components can include, for each receiver array, generating aZZ+bXX+cYY with a, b, and c being numerical coefficients or generating dIJ+eJI, where IJ and JI are different components of the 9 possible conductivity combinations with d and e being numerical coefficients. Generating data with respect to evaluation of formation around the wellbore can include performing vertical-resolution matching/enhancement based on the mixed together combinations measured from the plurality of receiver arrays operated at multiple frequencies.

Generating data with respect to evaluation of formation around the wellbore can include separating the combination of components for each receiver array into two sets based on distance of each receiver array from a transmitter array from which the acquiring signals are based. One set of the two sets can have combinations of components from receiver arrays categorized as short arrays, while the other set of the two sets can have combinations of components from receiver arrays categorized as deeper arrays relative to the short arrays. The combination of components for each receiver array can be used in an inversion process, in which data from the combinations or inversion of components of the short arrays is used as constraints in inverting the combinations of components of the deeper arrays. The categorization of short arrays and deep arrays can be based on a selected threshold. For a selected distance threshold, receiver arrays having separation distances from the transmitter less than the threshold are categorized as a short array and receiver arrays having separation distances from the transmitter greater than the threshold are categorized as a deep array. For a separation distance equal to the threshold, the associated receiver array can be categorized as either a short array or a deep array.

Filters can be applied to the combinations of components from the receiver arrays. The filters can be realized as being weights generated from generating an apparent conductivity of a radial-direction focusing log. Generating data from the mixed together combinations includes using filter weights from a library/look-up table for different background conductivities.

In various embodiments, a machine-readable storage device can comprise instructions stored thereon, which, when performed by a machine, cause the machine to perform operations, the operations comprising one or more features similar to or identical to features of methods and techniques described herein. The physical structure of such instructions may be operated on by one or more processors. Executing these physical structure can cause the machine to perform operations to acquire signals generated from operating a MCI tool in a wellbore, the MCI tool having a plurality of receiver arrays; to generate, for each receiver array at a fixed frequency, a combination of components from the acquired signals, the components corresponding to components of an apparent conductivity tensor; to mix together combinations measured from the plurality of receiver arrays tool; and to generate data, with respect to evaluation of formation around the wellbore, from the mixed together combinations. The combination of components can include, but are not limited to, XX, YY, and ZZ components or the combination of components can include cross-coupling components such as XZ and ZX. The instructions can include instructions to operate a MCI tool having one or more transmitters and one or more receivers to provide data to a processing unit in accordance with the teachings herein. Further, a machine-readable storage device, herein, is a physical device that stores data represented by physical structure within the device. Examples of machine-readable storage devices can include, but are not limited to, read only memory (ROM), random access memory (RAM), a magnetic disk storage device, an optical storage device, a flash memory, and other electronic, magnetic, and/or optical memory devices.

In various embodiments, a system can comprise a tool structure and a processing unit to process data from operating the tool structure. The tool structure can be a MCI tool structure having a transmitter array and a plurality of receiver arrays, where the MCI tool structure is capable of operating in a wellbore. Each receiver array may be realized by a receiver triad disposed axially on the tool structure and the transmitter array may be realized by a transmitter triad disposed axially on the tool structure, where the each receiver arrays are disposed at different distances from the transmitter triad. The processing unit can be structured: to acquire signals from the tool structure; to generate, for each receiver array at a fixed frequency, a combination of components from the acquired signals, the components corresponding to components of an apparent conductivity tensor; to mix together combinations measured from the plurality of receiver arrays tool; and to generate data, with respect to evaluation of formation around the wellbore, from mixing combinations together. The combination of components can include, but are not limited to XX YY, and ZZ components or the combination of components including cross-coupling components.

The processing unit can be structured to perform processing techniques similar to or identical to the techniques discussed herein. The processing unit may control selective activation of the transmitters and acquisition of signals from the receivers. Alternatively, a control unit can be used to control and manage the transmitters and receivers. The processing unit can be configured to process the acquired signals and process data related to or generated from the acquired signals. The processing unit may be arranged as an integrated unit or a distributed unit. The processing unit can be disposed at the surface of a wellbore to process MCI data from operating the tool structure downhole. The processing unit be disposed in a housing unit integrated with the tool structure or arranged downhole in the vicinity of the tool structure. The processing unit may process in real time multi-component induction data in a manner similar to or identical to the techniques discussed herein.

Figure 6:
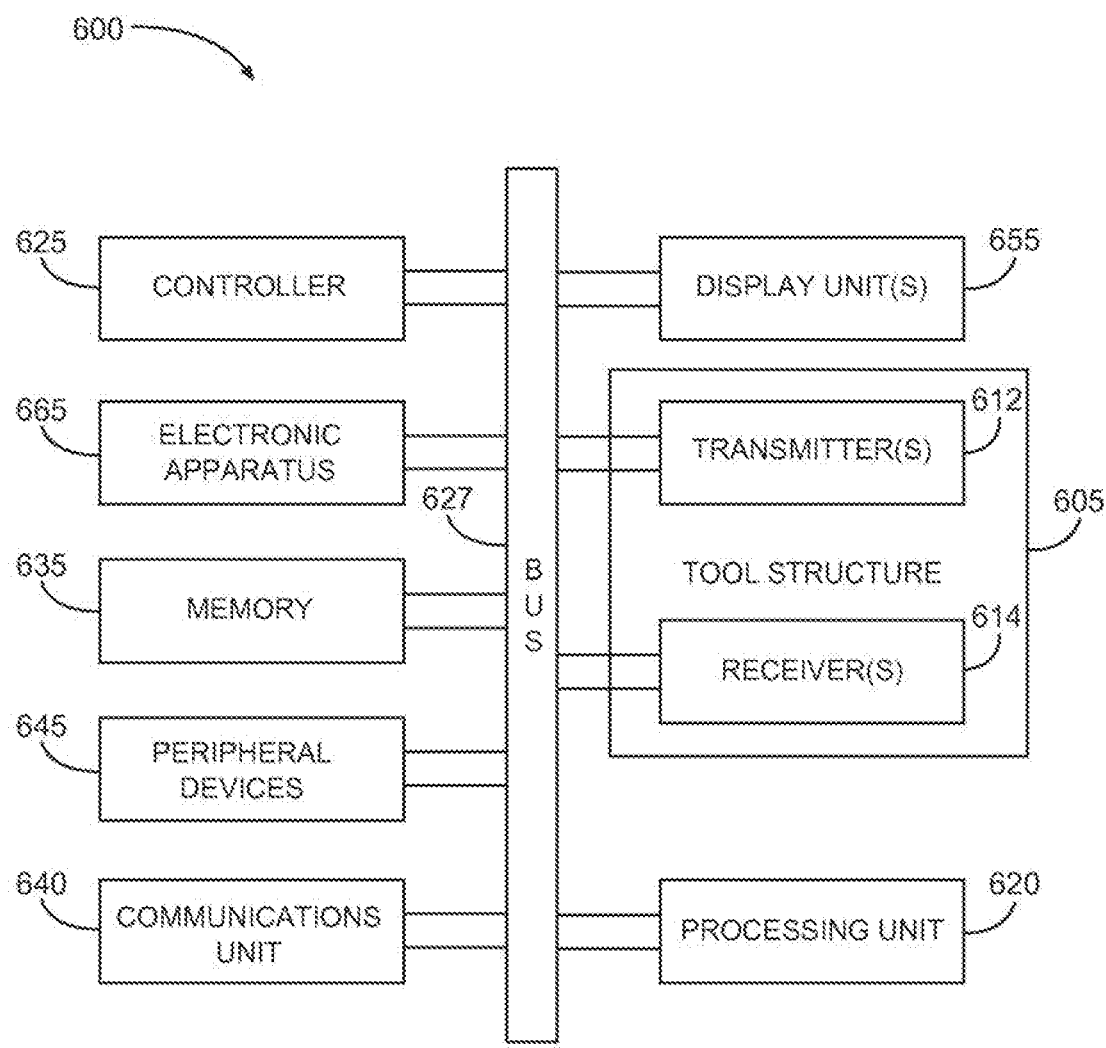
FIG. 6 depicts a block diagram of features of an example system arranged to process signals from a MCI tool structure operable in a wellbore, in accordance with various embodiments.

FIG. 6 depicts a block diagram of features of an example system 600 operable to control a multi-component induction tool to conduct measurements in a wellbore and to process data derived from operating the multi-component induction tool. The system 600 includes a tool structure 605 having an arrangement of transmitter antenna(s) 612 and receiver antenna(s) 614 operable in a wellbore. The arrangements of the transmitter antenna(s) 612 and the receiver antenna(s) 614 of the tool 605 can be realized similar to or identical to arrangements discussed herein. The system 600 can also include a controller 625, a memory 635, an electronic apparatus 665, and a communications unit 640. The controller 625 and the memory 635 can be arranged to operate the tool 605 to acquire measurement data as the tool 605 is operated. The controller 625 and the memory 635 can be realized to control activation of selected ones of the transmitter antennas 612 and data acquisition by selected one of the receiver antennas 614 in the tool 605 and to manage processing schemes with respect to data derivable from measurements using tool 605 as described herein. Processing unit 620 can be structured to perform the operations to manage processing schemes in a manner similar to or identical to embodiments described herein.

Electronic apparatus 665 can be used in conjunction with the controller 625 to perform tasks associated with taking measurements downhole with the transmitter antenna(s) 614 and the receiver antenna(s) 612 of the tool 605. The communications unit 640 can include downhole communications in a drilling operation. Such downhole communications can include a telemetry system.

The system 600 can also include a bus 627, where the bus 627 provides electrical conductivity among the components of the system 600. The bus 627 can include an address bus, a data bus, and a control bus, each independently configured. The bus 627 can also use common conductive lines for providing one or more of address, data, or control, the use of which can be regulated by the controller 625. The bus 627 can be configured such that the components of the system 600 are distributed. Such distribution can be arranged between downhole components such as the transmitter antenna(s) 612 and the receiver antenna(s) 614 of the tool 605 and components that can be disposed on the surface of a well. Alternatively, various of these components can be co-located such as on one or more collars of a drill string or on a wireline structure.

In various embodiments, peripheral devices 645 can include displays, additional storage memory, and/or other control devices that may operate in conjunction with the controller 625 and/or the memory 635. In an embodiment, the controller 625 can be realized as one or more processors. The peripheral devices 645 can be arranged to operate in conjunction with display unit(s) 655 with instructions stored in the memory 635 to implement a user interface to manage the operation of the tool 605 and/or components distributed within the system 600. Such a user interface can be operated in conjunction with the communications unit 640 and the bus 627. Various components of the system 600 can be integrated with the tool structure 605 such that processing identical to or similar to the processing schemes discussed with respect to various embodiments herein can be performed downhole in the vicinity of the measurement or at the surface.

Figure 7:
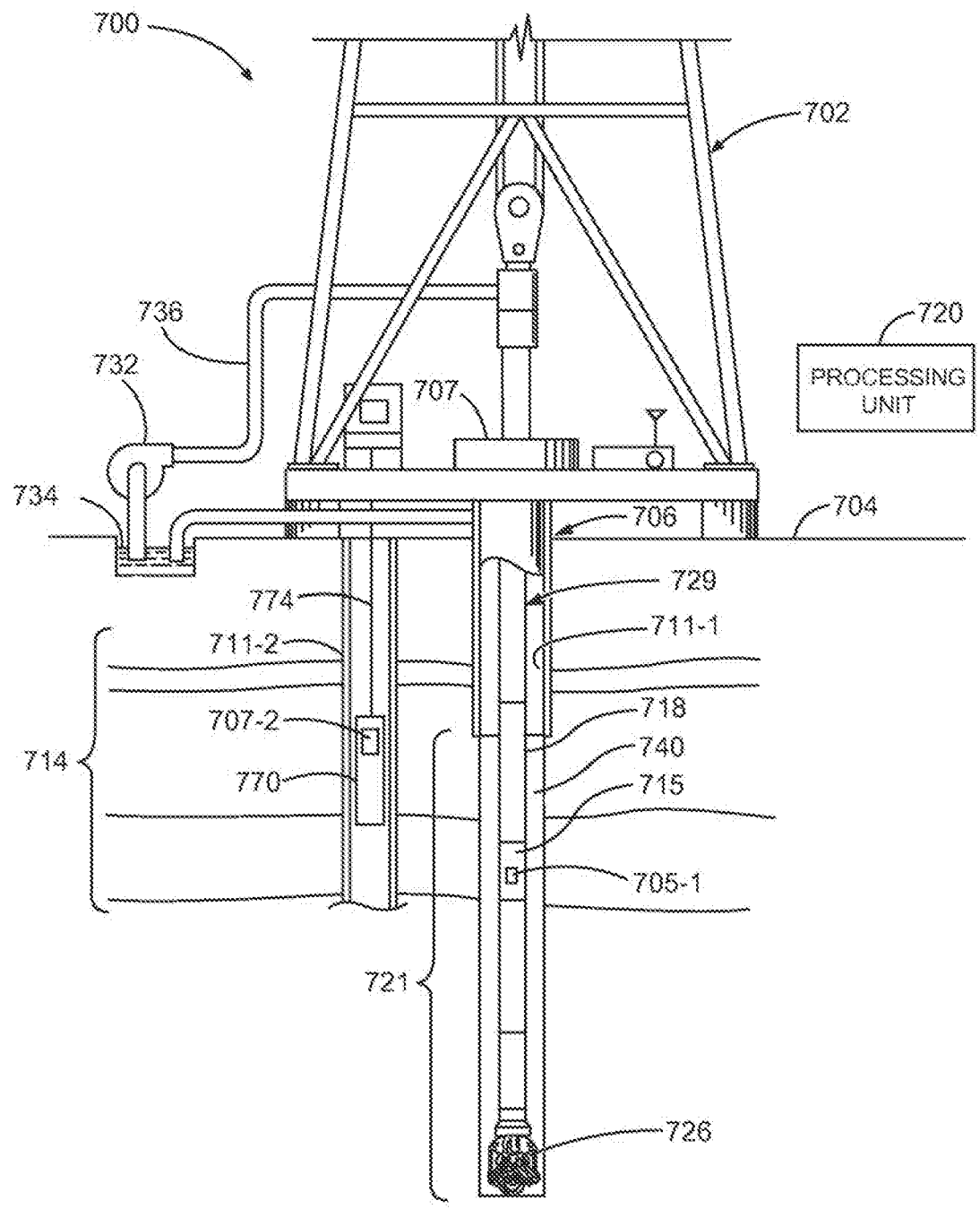
FIG. 7 depicts an embodiment of a system at a drilling site, where the system includes a MCI tool structure and a processing unit operable to process MCI data, in accordance with various embodiments.

FIG. 7 depicts an embodiment of a system 700 at a drilling site, where the system 700 includes an apparatus operable to control a multi-component induction tool to conduct measurements in a wellbore and to process data derived from operating the multi-component induction tool. The system 700 can include a tool 705-1, 705-2, or both 705-1 and 705-2 having an arrangement of transmitter antennas and receiver antennas operable to make measurements that can be used for a number of drilling tasks including, but not limited to, processing multi-component induction data. The tools 705-1 and 705-2 can be structured identical to or similar to a tool architecture or combinations of tool architectures discussed herein, including control units and processing units operable to perform processing schemes in a manner identical to or similar to processing techniques discussed herein. The tools 705-1, 705-2, or both 705-1 and 705-2 can be distributed among the components of system 700. The tools 705-1 and 705-2 can be realized in a similar or identical manner to arrangements of control units, transmitters, receivers, and processing units discussed herein. The tools 705-1 and 705-2 can be structured, fabricated, and calibrated in accordance with various embodiments as taught herein.

The system 700 can include a drilling rig 702 located at a surface 704 of a well 706 and a string of drill pipes, that is, drill string 729, connected together so as to form a drilling string that is lowered through a rotary table 707 into a wellbore or borehole 711-1. The drilling rig 702 can provide support for the drill string 729. The drill string 729 can operate to penetrate rotary table 707 for drilling the borehole 711-1 through subsurface formations 714. The drill string 729 can include a drill pipe 718 and a bottom hole assembly 721 located at the lower portion of the drill pipe 718.

The bottom hole assembly 721 can include a drill collar 716 and a drill bit 726. The drill bit 726 can operate to create the borehole 711-1 by penetrating the surface 704 and the subsurface formations 714. The bottom hole assembly 721 can include the tool 705-1 attached to the drill collar 716 to conduct measurements to determine formation parameters. The tool 705-1 can be structured for an implementation as a MWD system such as a LWD system. The housing containing the tool 705-1 can include electronics to initiate measurements from selected transmitter antennas and to collect measurement signals from selected receiver antennas. Such electronics can include a processing unit to provide analysis of multi-component induction data over a standard communication mechanism for operating in a well. Alternatively, electronics can include a communications interface to provide measurement signals collected by the tool 705-1 to the surface over a standard communication mechanism for operating in a well, where these measurements signals can be analyzed at a processing unit 720 at the surface to provide analysis of multi-component induction data.

During drilling operations, the drill string 729 can be rotated by the rotary table 707. In addition to, or alternatively, the bottom hole assembly 721 can also be rotated by a motor (e.g., a mud motor) that is located downhole. The drill collars 716 can be used to add weight to the drill bit 726. The drill collars 716 also can stiffen the bottom hole assembly 721 to allow the bottom hole assembly 721 to transfer the added weight to the drill bit 726, and in turn, assist the drill bit 726 in penetrating the surface 704 and the subsurface formations 714.

During drilling operations, a mud pump 732 can pump drilling fluid (sometimes known by those of skill in the art as "drilling mud") from a mud pit 734 through a hose 736 into the drill pipe 718 and down to the drill bit 726. The drilling fluid can flow out from the drill bit 726 and be returned to the surface 704 through an annular area 740 between the drill pipe 718 and the sides of the borehole 711-1. The drilling fluid may then be returned to the mud pit 734, where such fluid is filtered. In some embodiments, the drilling fluid can be used to cool the drill bit 726, as well as to provide lubrication for the drill bit 726 during drilling operations. Additionally, the drilling fluid may be used to remove subsurface formation cuttings created by operating the drill bit 726.

In various embodiments, the tool 705-2 may be included in a tool body 770 coupled to a logging cable 774 such as, for example, for wireline applications. The tool body 770 containing the tool 705-2 can include electronics to initiate measurements from selected transmitter antennas and to collect measurement signals from selected receiver antennas. Such electronics can include a processing unit to provide analysis of multi-component induction data over a standard communication mechanism for operating in a well. Alternatively, electronics can include a communications interface to provide measurement signals collected by the tool 705-2 to the surface over a standard communication mechanism for operating in a well, where these measurements signals can be analyzed at a processing unit 720 at the surface to provide analysis of multi-component induction data. The logging cable 774 may be realized as a wireline (multiple power and communication lines), a mono-cable (a single conductor), and/or a slick-line (no conductors for power or communications), or other appropriate structure for use in the borehole 711-2. Though FIG. 7 depicts both an arrangement for wireline applications and an arrangement for LWD applications, the system 700 may be also realized for one of the two applications.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
    acquiring signals generated from operating a multi-component induction tool in a wellbore, the multi-component induction tool having a plurality of receiver arrays, each receiver array comprising a receiver triad;
    generating, for each receiver array at a fixed frequency, a combination of components from the acquired signals, the components corresponding to components of an apparent conductivity tensor, wherein generating the combination of components comprises generating vertical magnetic dipole (VIVID) data and horizontal magnetic dipole (HMD) data;
    for each of one or more receiver arrays, combining a geometric factor associated with each receiver of the receiver triad of the receiver array to form a respective combination of the geometric factors, wherein the receivers of the receiver triad are oriented in different directions;
    generating filters based on (i) the one or more combinations of geometric factors and (ii) a target function, wherein each of the one or more combinations of geometric factors correlates the electromagnetic properties of the downhole formation to the apparent conductivity tensor;
    mixing together the combination of VIVID data and HMD data measured from the plurality of receiver arrays wherein the mixing comprises applying the filters to the one or more combinations of components; and
    generating data, with respect to evaluation of a formation around the wellbore, from the mixing together of combinations, wherein the data has an improved resolution at multiple depths of investigation compared to the acquired signals.

2. The method of claim 1, wherein generating the VIVID data comprises generating ZZ coupling data, and wherein generating the HMD data comprises generating XX coupling data and YY coupling data.

3. The method of claim 1, further comprising:
performing the acquiring of signals and the generating of the combinations for a number of different locations to which the multi-component induction tool is disposed along the wellbore; and
mixing together the combinations from the different locations.

4. The method of claim 1, wherein generating the VIVID data and the HMD data comprises, for each receiver array and each frequency, at least one of generating aZZ+bXX+cYY with a, b, and c being numerical coefficients and generating dIJ+e JI, IJ and JI being different components of the apparent conductivity tensor with d and e being numerical coefficients.

5. The method of claim 1, wherein generating data with respect to evaluation of formation around the wellbore comprises performing vertical-resolution matching based on the mixed together combinations measured from the plurality of receiver arrays.

6. The method of claim 1, wherein generating data with respect to evaluation of formation around the wellbore comprises:
separating the combination of components for each receiver array into two sets based on a distance of each receiver array from a transmitter array from which the acquired signals is based, one set of the two sets having combinations of components from the plurality of receiver arrays categorized as short arrays and the other set of the two sets having combinations of components from the plurality of receiver arrays categorized as deeper arrays relative to the short arrays; and
using the combination of components for each receiver array in an inversion process, in which data from the combinations of components of the short arrays is used as constraints in inverting the combinations of components of the deeper arrays.

7. The method of claim 1, further comprising applying filters to the combinations of components from the receiver arrays, the filters being weights generated from generating an apparent conductivity.

8. The method of claim 7, wherein generating data from the mixed together combinations comprises using filter weights for different background conductivities.

9. The method of claim 1, further comprising selecting a format of the combination of components based on a specific feature of the formation.

10. The method of claim 9, wherein the specific feature is at least one of anisotropy, bed boundaries, and fractures.

11. The method of claim 1, wherein acquiring signals generated from operating the multi-component induction tool comprises acquiring signals from a plurality of receiver triads disposed axially on the multi-component induction tool in response to a transmitter triad disposed axially on the multi-component induction tool generating probe signals, the receiver triads at different distances from the transmitter triad.

12. One or more non-transitory machine-readable media comprising program code for evaluation of a formation, the program code to:
acquire signals generated from operating a multi-component induction tool in a wellbore, the multi-component induction tool having a plurality of receiver arrays, each receiver array comprising a receiver triad;
generate, for each receiver array at a fixed frequency, a combination of components from the acquired signals, the components corresponding to components of an apparent conductivity tensor, wherein generating the combination of components comprises generating vertical magnetic dipole (VIVID) data and horizontal magnetic dipole (HMD) data;
for each of one or more receiver arrays, combine, under control of a processor, a geometric factor associated with each receiver of the receiver triad of the receiver array to form a respective combination of the geometric factors, wherein the receivers of the receiver triad are oriented in different directions;
generate, under control of the processor, filters based on (i) the one or more combinations of geometric factors and (ii) a target function, wherein each of the one or more combinations of geometric factors correlates the electromagnetic properties of the downhole formation to the apparent conductivity tensor;
mix together the combination of VIVID data and HMD data measured from the plurality of receiver arrays, wherein the mixing comprises applying the filters to the one or more combinations of components; and
generate data, with respect to evaluation of the formation around the wellbore, from the mixed together combinations, wherein the data has an improved resolution at multiple depths of investigation compared to the acquired signals.

13. The one or more non-transitory machine-readable media of claim 12, wherein the program code to generate the VIVID data comprises program code to generate ZZ coupling data, and wherein the program code to generate the HMD data comprises program code to generate XX coupling data and YY coupling data.

14. The one or more non-transitory machine-readable media of claim 12, wherein the program code is to:
perform acquisition of signals and generation of the combinations for a number of different locations to which the multi-component induction tool is disposed along the wellbore; and
mix together the combinations from the different locations.

15. The one or more non-transitory machine-readable media of claim 12, wherein the program code to generate the VIVID data and the HMD data comprises, for each receiver array at the fixed frequency, at least one of program code to generate aZZ+bXX+cYY with a, b, and c being numerical coefficients and program code to generate dIJ+e JI, IJ and JI being different components of the apparent conductivity tensor with d and e being numerical coefficients.

16. The one or more non-transitory machine-readable media of claim 12, wherein the program code to generate data with respect to evaluation of formation around the wellbore comprises program code to perform vertical-resolution matching based on the mixed together combinations measured from the plurality of receiver arrays.

17. The one or more non-transitory machine-readable media of claim 12, wherein the program code to acquire signals generated from operating the multi-component induction tool comprises program code to acquire signals from a plurality of receiver triads disposed axially on the multi-component induction tool in response to a transmitter triad disposed axially on the multi-component induction tool generating probe signals, the receiver triads at different distances from the transmitter triad.

18. An apparatus comprising:
a multi-component induction tool having a transmitter array and a plurality of receiver arrays, wherein the multi-component induction tool is configured for operation in a wellbore and each receiver array comprises a receiver triad;
a processor; and
a machine-readable medium having program code executable by the processor to cause the apparatus to:
acquire signals generated from the transmitter array;
generate, for each receiver array of the plurality of receiver arrays at a fixed frequency, a combination of components from the acquired signals, the components corresponding to components of an apparent conductivity tensor, wherein generating the combination of components comprises generating vertical magnetic dipole (VMD) data and horizontal magnetic dipole (HMD) data;
for each of one or more receiver arrays, combine, under control of the processor, a geometric factor associated with each receiver of the receiver triad of the receiver array to form a respective combination of the geometric factors, wherein the receivers of the receiver triad are oriented in different directions;
generate, under control of the processor, filters based on (i) the one or more combinations of geometric factors and (ii) a target function, wherein each of the one or more combinations of geometric factors correlates the electromagnetic properties of the downhole formation to the apparent conductivity tensor;
mix together the combination of VMD data and HMD data measured from the plurality of receiver arrays wherein the mixing comprises applying the filters to the one or more combinations of components; and
generate data, with respect to evaluation of a formation around the wellbore, from the mixed together combinations.

19. The apparatus of claim 18,
wherein the program code executable by the processor to cause the apparatus to generate the VIVID data comprises program code executable by the processor to cause the apparatus to generate ZZ coupling data, and
wherein the program code executable by the processor to cause the apparatus to generate the HMD data comprises program code executable by the processor to cause the apparatus to generate XX coupling data and YY coupling data.

20. The apparatus of claim 18, wherein the program code executable by the processor to cause the apparatus to generate the VIVID data and the HMD data comprises, for each receiver array at the fixed frequency, at least one of program code executable by the processor to cause the apparatus to generate aZZ+bXX+cYY with a, b, and c being numerical coefficients and program code executable by the processor to cause the apparatus to generate dIJ+e JI, IJ and JI being different components of the apparent conductivity tensor with d and e being numerical coefficients.

* * * * *